US012654649B2

(12) United States Patent
Turner

(10) Patent No.: US 12,654,649 B2
(45) **Date of Patent: *Jun. 16, 2026**

(54) SELF-CONTAINED PROXIMITY SENSORS IN WIRELESS COMMUNICATION WITH VEHICLE CONTROL SYSTEM AND METHODS OF THEIR OPERATION

(71) Applicant: VOXX INTERNATIONAL CORPORATION, Hauppauge, NY (US)

(72) Inventor: James S. Turner, Rockwell, TX (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 18/403,422

(22) Filed: Jan. 3, 2024

(65) Prior Publication Data

US 2024/0132017 A1     Apr. 25, 2024

Related U.S. Application Data

(63) Continuation of application No. 17/390,390, filed on Jul. 30, 2021, now Pat. No. 11,866,004, which is a
(Continued)

(51) Int. Cl.
B60R 25/24 (2013.01)
B60Q 5/00 (2006.01)
(Continued)

(52) U.S. Cl.
CPC .............. B60R 25/24 (2013.01); B60Q 5/005 (2013.01); E05B 77/00 (2013.01); E05F 15/76 (2015.01);
(Continued)

(58) Field of Classification Search
None
See application file for complete search history.

(56) References Cited

U.S. PATENT DOCUMENTS 9,008,917 B2    4/2015  Gautama et al.
9,894,492 B1    2/2018  Elangovan et al.
(Continued)

*Primary Examiner* — Daniel L Greene
(74) *Attorney, Agent, or Firm* — Price Heneveld LLP; Brian James Brewer

(57) ABSTRACT

Proximity sensors, e.g., Bluetooth® sensors, are installed in a vehicle. Each sensor determines/estimates approximate distance from itself to a user mobile device. In response to the distance increasing above a predetermined distance departure limit, as the sensors communicate to a vehicle control system (VCS) through Bluetooth® or similar links, the VCS causes predetermined departure actions to be performed, such as locking the doors, turning off headlights, activating the vehicle's security system, and/or others. In response to the distance decreasing below a predetermined distance arrival limit, as the sensors communicate to the VCS through the link(s), the VCS causes predetermined arrival actions to be performed, such as unlocking the doors, flashing the headlights, beeping the horn, deactivating the security system, and/or others. Hysteresis may be applied to the decisions whether to perform the departure/arrival actions.

31 Claims, 4 Drawing Sheets

Related U.S. Application Data continuation of application No. 16/241,953, filed on Jan. 7, 2019, now Pat. No. 11,117,549.

(60) Provisional application No. 62/614,273, filed on Jan. 5, 2018.

(51) Int. Cl.

| | |
|---|---|
| *E05B 77/00* | (2014.01) |
| *E05F 15/76* | (2015.01) |
| *H04B 7/26* | (2006.01) |
| *B60Q 1/00* | (2006.01) |

(52) U.S. Cl.

CPC ................ *H04B 7/26* (2013.01); *B60Q 1/00* (2013.01); *B60R 2325/101* (2013.01); *E05Y 2201/22* (2013.01); *E05Y 2400/44* (2013.01); *E05Y 2400/45* (2013.01); *E05Y 2400/664* (2013.01); *E05Y 2400/852* (2013.01); *E05Y 2900/542* (2013.01); *E05Y 2900/55* (2013.01)

(56) References Cited

U.S. PATENT DOCUMENTS

| | | | |
|---|---|---|---|
| 10,249,182 | B1 | 4/2019 | Turner et al. |
| 2006/0015233 | A1* | 1/2006 | Olsen, III ................ G07C 9/28 |
| | | | 701/2 |
| 2006/0164208 | A1* | 7/2006 | Schaffzin ........... G07C 9/00182 |
| | | | 340/686.2 |
| 2007/0257841 | A1 | 11/2007 | Hermann |
| 2010/0022217 | A1 | 1/2010 | Ketari |
| 2013/0317944 | A1 | 11/2013 | Huang et al. |
| 2014/0240091 | A1 | 8/2014 | Talty et al. |
| 2015/0279138 | A1 | 10/2015 | Nagai et al. |
| 2016/0006577 | A1* | 1/2016 | Logan ..................... H04W 4/80 |
| | | | 700/276 |
| 2016/0066254 | A1 | 3/2016 | Colby et al. |
| 2016/0098871 | A1 | 4/2016 | Oz et al. |
| 2017/0021801 | A1 | 1/2017 | Yamamoto et al. |
| 2017/0092030 | A1 | 3/2017 | Badger, II |
| 2017/0309098 | A1 | 10/2017 | Watters et al. |
| 2018/0225898 | A1* | 8/2018 | Kirkland .................. G07C 9/28 |
| 2019/0176759 | A1 | 6/2019 | Heinrich et al. |
| 2021/0009079 | A1* | 1/2021 | Bourassi ............ G07C 9/00309 |

* cited by examiner

150

200

300

400

SELF-CONTAINED PROXIMITY SENSORS IN WIRELESS COMMUNICATION WITH VEHICLE CONTROL SYSTEM AND METHODS OF THEIR OPERATION

CROSS-REFERENCE TO RELATED APPLICATIONS

This application is a continuation of U.S. application Ser. No. 17/390,390, filed Jul. 30, 2021, now U.S. Pat. No. 11,866,004, issued Jan. 9, 2024, which is a continuation of U.S. application Ser. No. 16/241,953, filed Jan. 7, 2019, now U.S. Pat. No. 11,117,549, issued Sep. 14, 2021, and claims benefit of U.S. Provisional Application No. 62/614,273, filed Jan. 5, 2018, all of which are hereby incorporated in their entireties by reference.

FIELD OF THE DISCLOSURE

This disclosure relates generally to the field of automotive and other vehicular security, convenience, monitoring, and control products, both aftermarket and OEM.

BACKGROUND

Vehicle control systems are typically (but not necessarily) aftermarket electronic systems installed in vehicles for users' convenience. The functionality provided by such systems may include remote start capability, as well as control of security and convenience features.

A need in the art exists for improved techniques for controlling certain security and convenience features of vehicles equipped with such systems. A need in the art exists for automating activation and deactivation of certain security and convenience features of the vehicles and vehicle control systems.

SUMMARY

This document describes embodiments, variants, implementations, and examples of novel techniques for addressing one or more of the needs identified above, and/or other needs. Selected embodiments described in this document include methods, apparatus, and articles of manufacture that enable automatic activation/deactivation of remote start systems in vehicles; automatic activation/deactivation of security systems installed in vehicles; automatic activation/deactivation of selected features of security systems installed in vehicles; automatic retraction/extension of rear view mirrors of vehicles; automatic placement of rear view mirrors installed in vehicles into pre-programmed positions; automatic opening and closing of vehicular doors, hatches, liftgates, tailgates, and sunroofs; and automatic arrangement/re-arrangement of other mechanical/electrical features of vehicles.

In an embodiment, a system includes a combination of a Bluetooth-enabled vehicle control system (VCS) and a plurality of self-contained RF-enabled (Bluetooth-enabled) proximity sensors for installation in a vehicle. Each sensor of the plurality of self-contained RF-enabled proximity sensors includes a battery powering the sensor. Each sensor also includes a Bluetooth transceiver configured to communicate with the VCS and each user mobile device (such as a smartphone) that is authorized to operate features of the VCS. Each sensor further includes a processing module configured to control the operation of the Bluetooth transceiver of the sensor and to send/receive data through the Bluetooth transceiver. The VCS and the plurality of self-contained RF-enabled sensors are configured to detect when no authorized user mobile device is within a predetermined departure distance and to perform one or more departure actions automatically in response to no authorized user mobile device being within the predetermined departure distance. The VCS and the sensors are also configured to detect when at least one authorized user mobile device is within a predetermined arrival distance and to perform one or more arrival actions automatically in response to at least one user mobile device being within the predetermined arrival distance. The detection is performed in the sensors and communicated to the VCS, which then performs the actions as needed. The departure actions my include activating power locks of the vehicle to lock the vehicle. The arrival actions may include activating power locks of the vehicle to unlock the vehicle. For ease of installation, each sensor communicates with the VCS via a Bluetooth link, and carries its own battery. Thus, installation of the sensors does not require wired electrical connections.

In an embodiment, an apparatus includes a combination of a vehicle control system (VCS) and a plurality of radio frequency (RF) enabled proximity sensors installed in a vehicle; each sensor of the plurality of RF enabled proximity sensors includes an RF transceiver configured to communicate with the VCS and one or more user mobile devices authorized to operate features of the VCS, and a processing module configured to control operation of the RF transceiver of said each sensor; the VCS and the plurality of RF-enabled sensors are configured to detect departure events when an authorized user mobile device crosses from within a predetermined distance departure limit of the vehicle to outside of the predetermined distance departure limit of the vehicle, and to perform one or more departure actions in response to one or more departure conditions being met, the one or more departure conditions comprising occurrence of a departure event.

In an embodiment, a method of operating a vehicle control system (VCS) installed in a vehicle includes providing in the vehicle a plurality of self-contained radio frequency (RF) enabled proximity sensors; pairing each sensor of the plurality of self-contained RF enabled proximity sensors to the VCS using Bluetooth communication standard; and configuring the VCS to detect departure events through the plurality of self-contained RF enabled proximity sensors by monitoring distances to one or more authorized user mobile devices and performing one or more departure actions in response to occurrence of each departure condition, said each departure condition comprising a departure event when an authorized user mobile device crosses from within a predetermined departure distance limit to outside of the predetermined departure distance limit of the vehicle.

Various features and aspects will be better understood with reference to the following description, drawings, and appended claims.

DETAILED DESCRIPTION

The words "embodiment," "variant," "example," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words/expressions with their inflectional morphemes, as well as similar words and phrases, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and subsequent process flow is selected based on whether the condition is met or not met.

The expression "processing logic" should be understood as selected steps/decision blocks and/or hardware/software/firmware for implementing the selected steps/decision blocks. "Decision block" means a step in which a decision is made based on some condition, and subsequent process flow is directed based on whether the condition is met or not met.

Some definitions have been explicitly provided above. Other and further explicit and implicit definitions and clarifications of definitions may be found throughout this document.

Figure 1A:
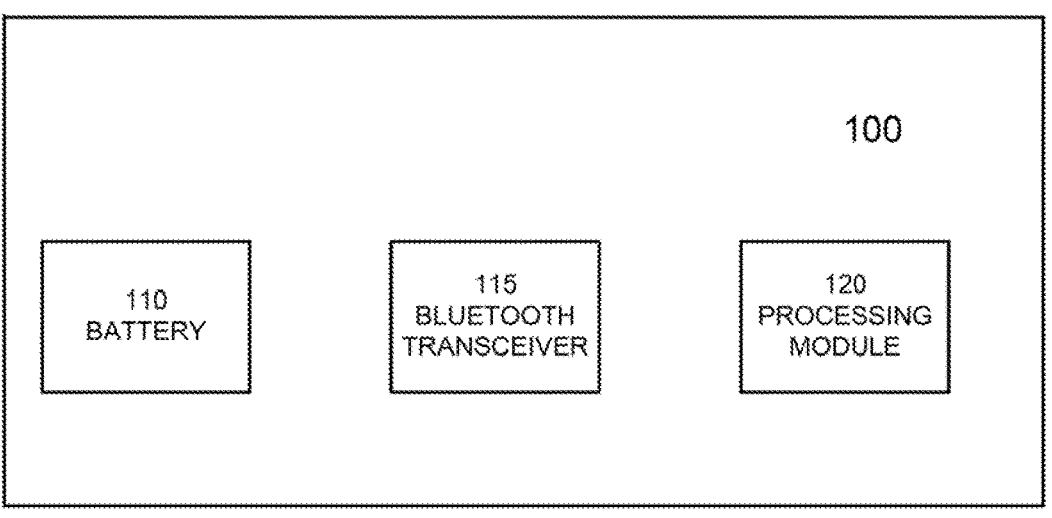
FIG. 1A illustrates selected components of a self-contained Bluetooth®-enabled proximity sensor, in accordance with selected aspects described in this document.

FIG. 1 illustrates selected components of a sensor 100 installed in a vehicle and functioning in conjunction with (e.g., as part of) a vehicle control system (VCS) of the vehicle. The VCS may be such as (or similar to or having selected components of) the vehicle control systems described in a now allowed commonly-owned U.S. patent application entitled REMOTE VEHICLE SYSTEM CON- FIGURATION, CONTROL, AND TELEMATICS, James S. Turner first-named inventor, Ser. No. 15/862,630, filed on or about Jan. 4, 2018, which is incorporated herein by reference for all purposes, including specification, abstract, figures, and claims. The DEI104UTL application may be referred to as the "incorporated application." The VCS may also be of another type.

The sensor 100 incudes a battery 110 for powering the other components of the sensor 100. The battery 110 may be a primary battery. It can also be a rechargeable battery, such as a Lithium Ion (Li-Ion), Lithium-Polymer (LiPo), Nickle Cadmium (NiCad). Nickle Metal Hydride (NiMH), and lithium titanate battery. The use of the word "battery" here means simply one or more cells; the battery 110 may but need not have multiple cells. In embodiments, the sensor 100 may be wired to the electrical system of the vehicle and draw operating power from the vehicle's electrical system; the battery 100 is then not needed, though it may still be included in the sensor 100. In embodiments, the sensor 100 includes an electrical power generator that may supply the needed electrical energy for the operation of the sensor 100 alone and/or in conjunction with the battery 100. Examples of such electrical power generators include a mechanical generator that generates electrical power from the motion of the vehicle in which the sensor 100 is installed; photovoltaic cell(s); a converter of RF emissions into electrical power suitable for operating the sensor 100; and other autonomous sources of electrical energy.

Although no connections are shown from the battery 110 to the other components of the sensor 100 that use electrical power, such connections are typically present. Moreover, the battery 110 may be able to provide electrical power for operation of devices that are external to the sensor 100 and are not part of the sensor 100. For example, the battery 110 may provide power for operation of a Global Positioning System (GPS) asset tracker.

The sensor 100 also includes a transceiver 115. The transceiver 115 may be a short range transceiver, such as a Bluetooth transceiver (including Bluetooth® Low Energy or BLE transceiver) which is capable of pairing with various other Bluetooth®-enabled devices and sending/receiving data to/from such Bluetooth®-enabled devices. The Bluetooth® transceiver 115 may communicate and have active Bluetooth® links with two or more other Bluetooth®-enabled devices. As will be seen below, here the Bluetooth® transceiver 115 may simultaneously have active links to the user mobile device(s), such as smartphones/tablets/smartwatches, and to the vehicle control system of the vehicle. Note that although FIG. 1 shows a single transceiver 115 and the discussion in this document refers to the transceiver 115 in the singular form, the transceiver 115 may include two or more receivers and/or transmitters; for example, two Bluetooth® transceivers may be included in the sensor 115, each capable of establishing one or more Bluetooth® links.

The sensor 100 additionally includes a processing block 120, which may have a processor or processors with supporting circuitry, such as memories including a non-volatile memory storing the machine instructions executed by the processor and configuration information. The configuration information may include the Bluetooth® pairing data for the vehicle control system and one or more user mobile devices. The processor or processors may be microprocessors, microcontrollers, dedicated or application-specific integrated circuit processors, or other processors.

The sensor 100 may also include an enclosure to contain the components of the sensor, and to facilitate installation in various locations of various vehicles.

Figure 1B:
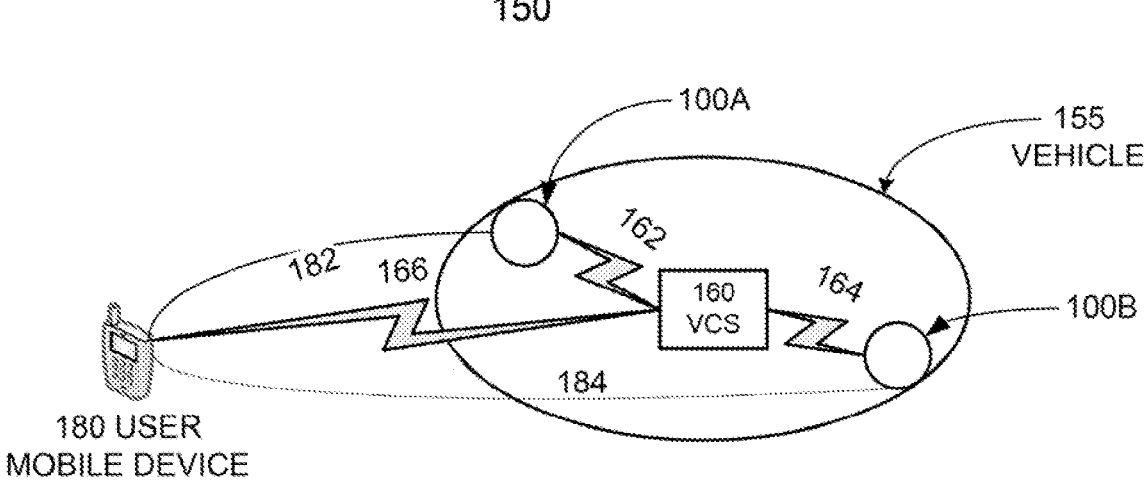
FIG. 1B illustrates selected parts of an arrangement including a vehicle with an installed vehicle control system in communication with self-contained Bluetooth®-enabled proximity sensors and a user mobile device.

In examples, an installation includes two or more sensors 100 that are attached to a vehicle in diverse locations, and configured to pair with the VCS of the vehicle. FIG. 1B illustrates selected parts of such an arrangement 150 in which a vehicle 155 includes a VCS 160 and a pair of sensors 100A/100B (such as the sensor 100 of FIG. 1) paired with the VCS 160 vial Bluetooth® links 162/164. The operation of the installed sensors 100A/100B is controlled by the VCS, and the sensors 100A/100B can send sensor data to be read by the VCS 160 over the links 162/164; the sensors 100A/100B may also communicate with or sense presence of user mobile devices authorized to operate the VCS 160. FIG. 1B shows one such user mobile device 180, which is paired with the VCS 160 over a Bluetooth® link 166. Lines 182 and 184 refer to communication links between the sensors 100A/100B and the user mobile device 180, or to sensing of RF transmissions of the user mobile device 180 by the sensors 100A/100B, for example, to estimate the distances between the sensors 100A/100B and the user mobile device 180. Thus, the sensors 100A/100B need not exchange information with the user mobile device 180 and similar user mobile devices, although in embodiments the sensors 100A/100B pair with authorized user mobile devices such as the user mobile device 180.

The VCS 160 may include its own processing module that controls the operation of the VCS and its interactions/communications with the sensors 100A/100B and the authorized user mobile devices such as the user mobile device 180. Each of the sensors 100A/100B may be configured to estimate the distance between itself and one or more authorized user mobile devices. For example, a given sensor 100 may estimate the distance based on the measurement of the strength of the received signal from a given user mobile device. See, for example, the description of iBeacon® protocol for operating Bluetooth® Low Energy devices. Note, however, that other techniques for communication between the sensors (e.g., 100A/100B) and/or the user mobile device(s) (e.g., 180) and for measuring/estimating the distances may be used. The use of signal strength for measuring/estimating distances, however, is specifically contemplated, so that a particular sensor 100 need not necessarily (but may) be paired to the authorized user mobile device (through Bluetooth®, for example) in order to estimate the distance between the user mobile device and the sensor 100. Ability to pair a sensor 100 and the user mobile device 180 may indicate that that the user mobile device 180 is within the predetermined distance departure limit and/or the predetermined distance arrival limit (which limits are discussed below).

Figure 2:
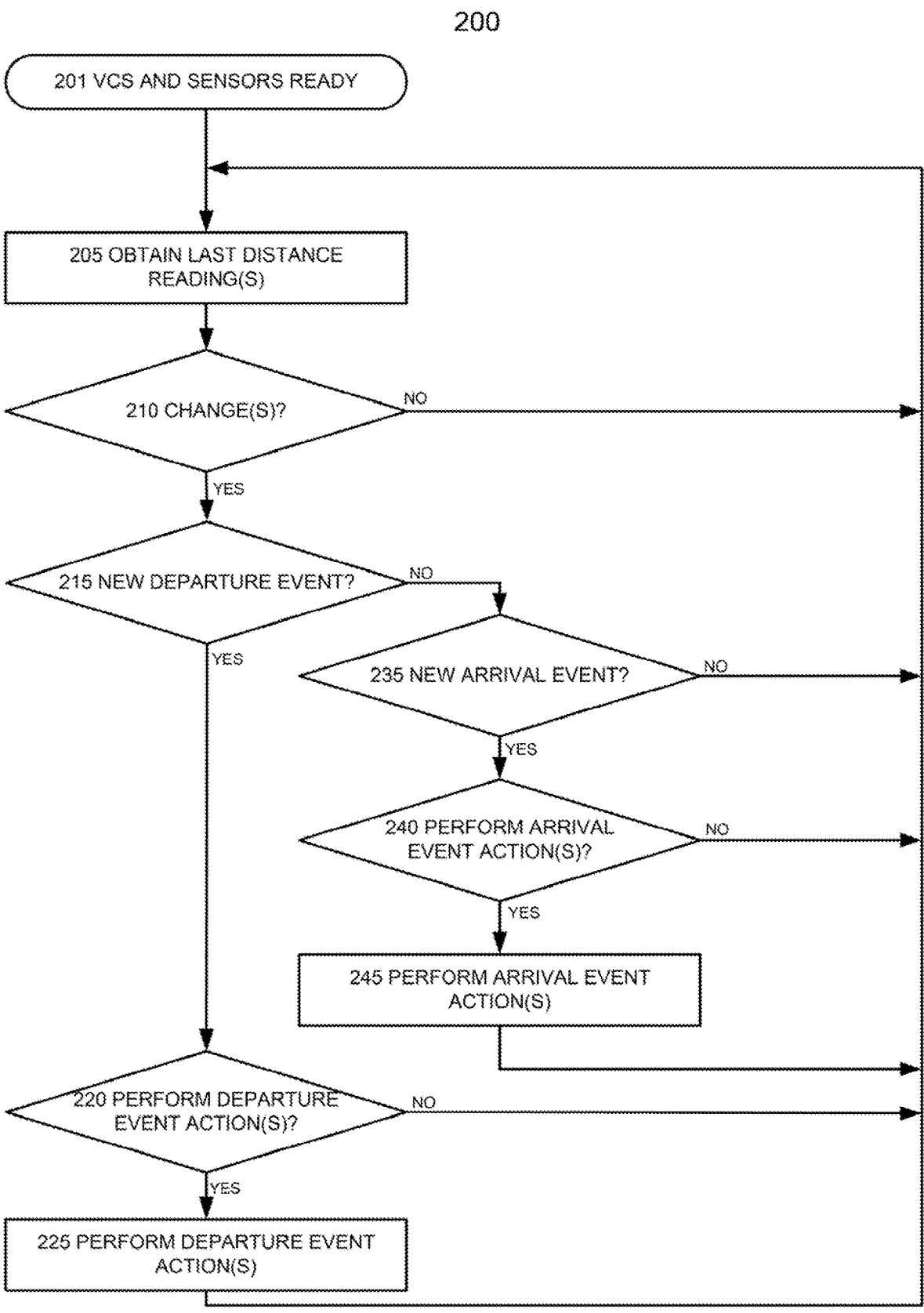
FIG. 2 illustrates selected steps of a process of exemplary operation of a vehicle control system and self-contained Bluetooth®-enabled sensors installed in a vehicle, in accordance with selected aspects described in this document.

FIG. 2 illustrates selected steps of a process 200 of an exemplary operation of the VCS and the sensors 100 installed in the vehicle.

At flow point 201, the VCS and the sensors 100 are installed, powered-up, and programmed/configured for operation. The configuration programming may include programming to pair automatically with one or more selected user mobile devices (e.g., smartphones, tablets, smart watches), and selection of distance parameters, such as a predetermined distance departure limit from the vehicle and a predetermined distance arrival limit from the vehicle. As will be seen below (particularly from the description of the other steps of the process 200), the predetermined distance departure limit is the distance between an authorized user mobile device and any of the sensors 100 such that when no authorized user mobile device is found within the predetermined distance departure limit, the VCS may perform certain actions in response to one of the authorized user mobile devices transitioning from being located within the predetermined distance departure limit to being located outside of the predetermined distance departure limit. Such transitioning may be considered to be a "departure event." i.e., the vehicle's user leaving the vehicle. Analogously, the predetermined distance arrival limit is the distance between an authorized user mobile device and any of the sensors 100) such that when an authorized user mobile device is found within the predetermined distance arrival limit, the VCS may perform certain actions in response to the authorized user mobile devices transitioning from being located outside the predetermined distance arrival limit to being located within the predetermined distance arrival limit. Such transitioning may be considered to be an "arrival event," i.e., the vehicle's user approaching the vehicle. When the VCS senses (through the sensors 100) an occurrence of a departure event, the VCS may perform certain preprogrammed action or actions ("departure event action" or "departure event actions" or "departure action" or "departure actions"), generally relating to the driver leaving the vehicle. The departure event actions may include, for example, locking the doors, turning off the headlights and/or other lights of the vehicle, activating the vehicle's security system, raising the windows, closing the sunroof, raising the convertible top, and retracting rear view mirrors. The VCS may be programmed with some time hysteresis so that if these actions have been performed recently, such as within a predetermined time period (1, 2, 3 seconds, for example) and/or in response to the user mobile device crossing the predetermined distance departure limit, the VCS does not perform them again. When the VCS senses (again, through the sensors 100) an occurrence of an arrival event, the VCS may perform certain preprogrammed action or actions ("arrival event action" or plural "arrival event actions"; or "arrival action" or plural "arrival actions"), generally relating the driver approaching the vehicle. The arrival event actions may include unlocking selected or all vehicle door(s), momentarily flashing the headlights, activating the horn, and deactivating the vehicle's security system. Moreover, the VCS can recognize the authorized user mobile device that caused the arrival event and place one or more of the rear view mirrors of the vehicle and driver seat of the vehicle into positions corresponding to the authorized user mobile device; the authorized user mobile device may be recognized based on a code transmitted by the authorized user mobile device; and the mirror/seat positions may be previously preprogrammed. As in the case of departure event, the VCS may be programmed with some time hysteresis so that if these actions have been performed recently, such as within a predetermined time period (within 1, 2, 3 seconds, for example) and/or in response to the user mobile device crossing the predetermined distance arrival limit, the VCS does not perform them again.

In step 205, the VCS obtains the last-read distances from the sensors 100. For example, the sensors 100 readings by the VCS may be done periodically, at predetermined times, in response to certain conditions, and/or otherwise. The sensors 100 may also provide updates of the distances to the VCS without interrogation, periodically, at predetermined time, in response to certain conditions such as a new active Bluetooth® link with one of the authorized user mobile devices. As discussed above, the sensors 100 may estimate the distance based on the characteristics of the Bluetooth® signal received from the Bluetooth®-enabled user mobile device.

In decision block 210, the VCS determines whether, since the previous reading in the step 205, there has been a change in the distances of each authorized user mobile device from the vehicle, i.e., from the sensors 100. For the decision block 210, a "change in distance" may be a predetermined (pre-programmed) difference in the sensed distance and/or a predetermined/preprogrammed difference in some measurement that correlates at least to some degree with the distance between the sensor and the authorized user mobile device. In embodiments, the predetermined/preprogrammed difference (in the sensed distance and/or the measurement correlating with the distance) is greater than the accuracy available from the sensors 100. If a given authorized user mobile device was (at the time of the previous or immediately preceding reading) and continues to be beyond communication/pairing range of the sensors 100, the VCS may consider that there has been no change in the distance to the given authorized user mobile device. Similarly, if a given authorized user mobile device was (at the time of the previous or immediately preceding reading) and continues to be within communication/pairing range of the sensors 100, the VCS may consider that there has been no change in the distance to the given authorized user mobile device.

If there has been no change determined in the decision block 210, process flow may loop back to the step 205. If there has been a change, the process flow continues to decision block 215.

In the decision block 215, the VCS determines whether a new (since the last performance of the test in the decision block 215) departure event has occurred. For example, the VCS may determine that the predetermined distance departure limit has been crossed and no authorized user mobile devices are in the vicinity of the vehicle). If a new departure event has occurred, process flow continues to decision block 220, where the VCS determines whether departure event action(s) should be performed. In this decision block, time hysteresis test may be applied, determining, for example, whether the departure event action(s) has/have not been performed within some predetermined time (as was discussed above in relation to departure hysteresis). If the determination in the decision block 220 results in a decision that the departure event action(s) need not be performed, the process flow returns to the step 205; otherwise, the process flow continues to step 225 where the departure event action(s) is/are performed, and the process flow returns to the step 205. As already mentioned, the departure event actions may include, for example, locking the vehicle's doors, turning off the headlights and/or other lights, activating the vehicle's security system, raising the windows, closing the sunroof, and raising the convertible top.

Turning now once again to the decision block 215, if no new departure event has taken place, the process flow continues to decision block 235.

In the decision block 235, the VCS determines whether a new arrival event (since the last performance of the test in the decision block 235) has occurred. For example, the VCS may determine that an authorized user mobile device became positioned within the predetermined distance arrival limit. If a new arrival event has occurred, process flow continues to decision block 240, where the VCS determines whether arrival event action(s) should be performed. In this decision block, the time hysteresis test may be applied, determining, for example, whether the arrival event action(s) has/have not been performed within some predetermined time (as was discussed above in relation to arrival hysteresis). If the determination in the decision block 240 results in a determination that the arrival event action(s) need not be performed, the process flow returns to the step 205; otherwise, the process flow continues to step 245 where the arrival event action(s) is/are performed. The arrival event actions may include unlocking selected or all the door(s) of the vehicle, momentarily flashing the headlights and/or other lights, activating the horn, turning on the cabin light, and deactivating the vehicle's security system. From the step 245, the process flow returns to the step 205.

Figure 3:
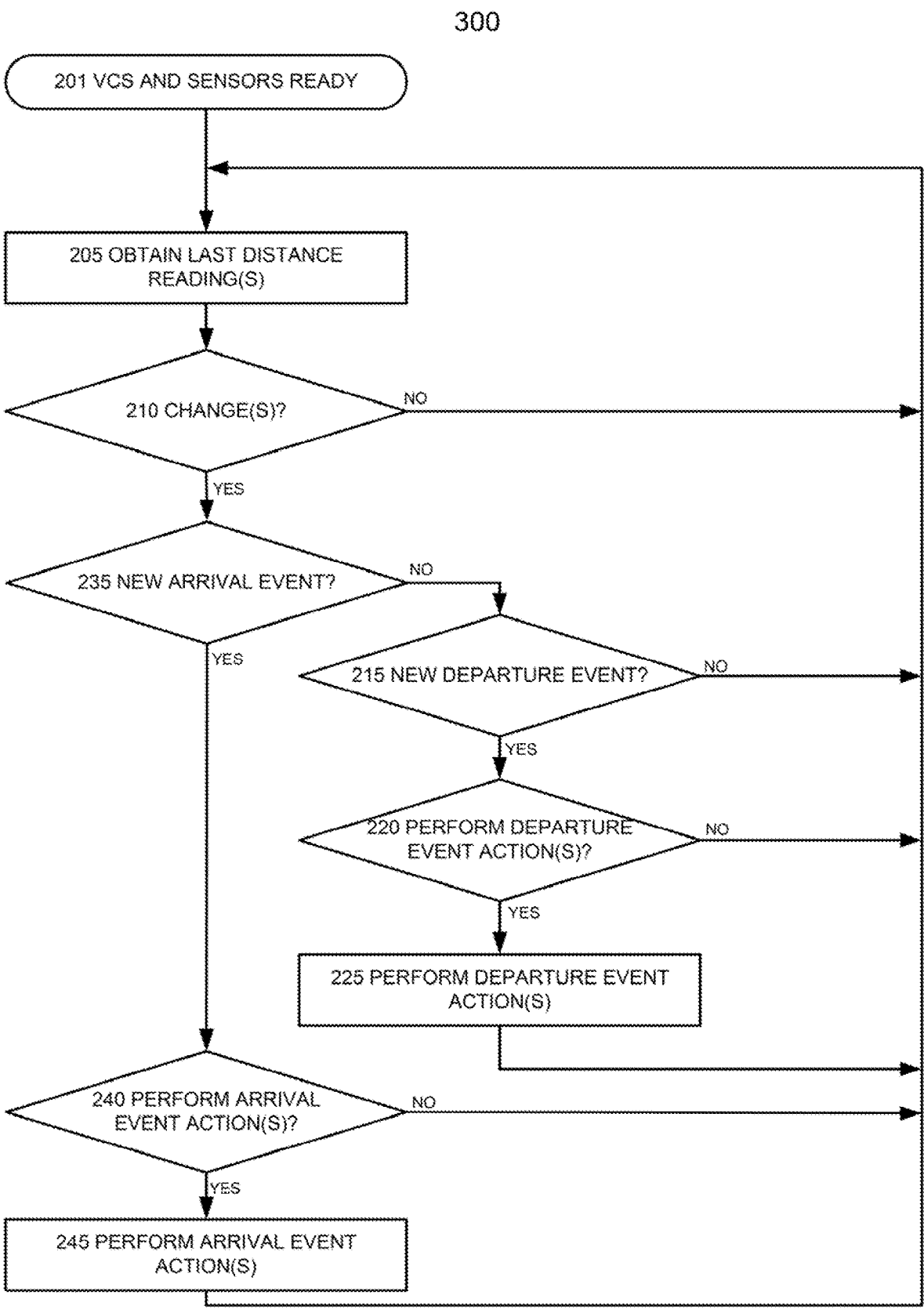
FIG. 3 illustrates selected steps of another process of exemplary operation of a vehicle control system and self-contained Bluetooth®-enabled sensors, installed in a vehicle, in accordance with selected aspects described in this document.

In the process 200, the VCS first checks for departure events and then for arrival events. Here and throughout this document, however, the process steps and decisions (if decision blocks are present) may be performed by same and/or separate elements in conjunction or in parallel, asynchronously or synchronously, in a pipelined manner, or otherwise. There is no particular requirement that the steps and decisions be performed in the same order in which this description lists them and/or the Figures show them, except where a specific order is inherently required, explicitly indicated, or is otherwise made clear from the context. For example, the order of checking for the departure and arrival events may be reversed. FIG. 3 illustrates selected steps of a process 300 of an exemplary operation of the VCS where checking for the arrival events is performed before checking for the departure events.

Figure 4:
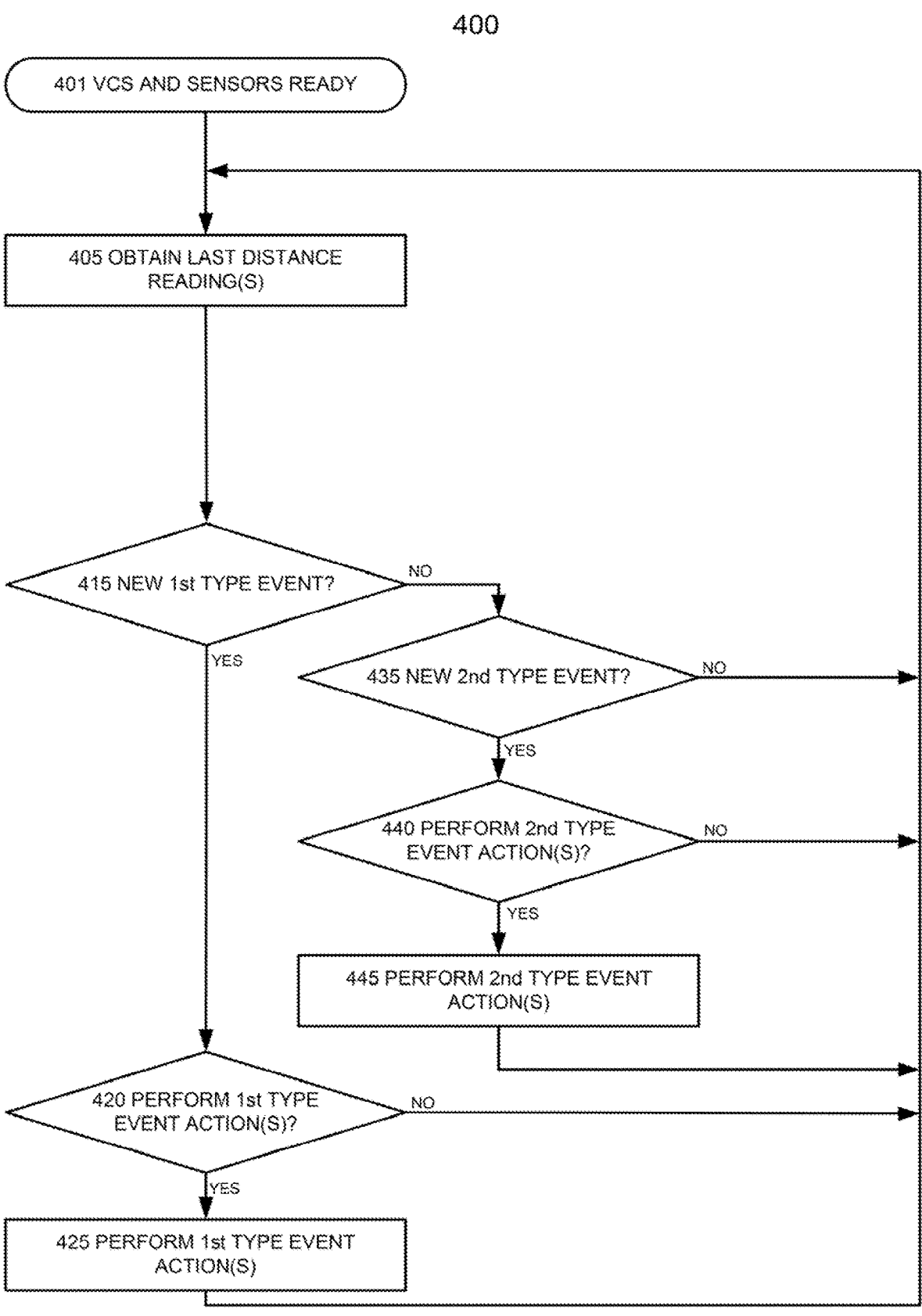
FIG. 4 illustrates selected steps of still another process of exemplary operation of a vehicle control system and self-contained Bluetooth®-enabled sensors, installed in a vehicle, in accordance with selected aspects described in this document.

Further, here and throughout this document, not every illustrated/described step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described. For example, FIG. 4 illustrates selected steps of a process 400 of an exemplary operation of the VCS in which checking for occurrence of changes (such as in decision block 210 in FIGS. 2 and 3) is omitted. Here, the VCS in decision block 415 checks for the occurrence of a first type of event (departure or arrival), and in decision block 435 checks for the occurrence of the second type of event (arrival or departure).

The predetermined distance departure limit may be shorter than, longer than, or same as the predetermined distance arrival limit.

The features described throughout this document may be present individually, or in any combination or permutation, except where the presence or absence of specific features (elements/limitations) is inherently required, explicitly indicated, or is otherwise made clear from the description. This applies whether or not the features appear related to specific embodiments; in other words, features of one described or illustrated embodiment may be included in another described or illustrated embodiment.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM). Electrically Erasable Programmable ROM (EEPROM), hard disk, a CD-ROM, a DVD-ROM, or other form of non-transitory storage medium. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for self-contained proximity sensors. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A vehicle system comprising:
a vehicle controller; and
at least one radio frequency (RF) vehicle device in wireless communication with the vehicle controller and cooperating therewith to:
wirelessly communicate with an authorized mobile device to generate an estimated distance between the at least one RF vehicle device and the authorized mobile device based upon an RF signal strength therebetween,
detect a departure event when the estimated distance indicates the authorized mobile device crossed a distance departure limit to permit a departure action in response thereto, and
detect an arrival event when the estimated distance indicates the authorized mobile device crossed a distance arrival limit to permit an arrival action in response thereto, wherein the distance departure limit and the distance arrival limit are different.

2. The system of claim 1, wherein the vehicle controller is configured to accept setting of the distance departure limit.

3. The system of claim 1, wherein the vehicle controller is configured to accept setting of the distance arrival limit.

4. The system of claim 1, wherein the departure action comprises at least one of locking vehicle doors, and activating a vehicle security feature.

5. The system of claim 1, wherein the vehicle controller is configured to provide departure time hysteresis.

6. The system of claim 1, wherein the arrival action comprises at least one of unlocking vehicle doors, activating a vehicle light, activating a vehicle horn, and deactivating a vehicle security feature.

7. The system of claim 1, wherein the vehicle controller is configured to provide arrival time hysteresis.

8. The system of claim 1, wherein the vehicle controller comprises a first housing and a first Bluetooth® transceiver carried therein.

9. The system of claim 1, wherein the at least one RF vehicle device comprises a second housing and a second Bluetooth® transceiver carried therein.

10. The system of claim 1, wherein the authorized mobile device comprises a smartphone.

11. The system of claim 1, wherein the authorized mobile device comprises a smartwatch.

12. A vehicle system comprising:
a vehicle controller comprising a first housing and a first Bluetooth® transceiver carried therein; and
at least one radio frequency (RF) vehicle device comprising a second housing and a second Bluetooth® transceiver carried therein, the at least one RF vehicle device being in Bluetooth® communication with the vehicle controller and cooperating therewith to;
wirelessly communicate with an authorized mobile device to generate an estimated distance between the at least one RF vehicle device and the authorized mobile device based upon an RF signal strength therebetween,
detect a departure event when the estimated distance indicates the authorized mobile device crossed a distance departure limit to permit a departure action in response thereto, and
detect an arrival event when the estimated distance indicates the authorized mobile device crossed a distance arrival limit to permit an arrival action in response thereto, wherein the distance arrival limit is shorter than the distance departure limit.

13. The system of claim 12, wherein the vehicle controller is configured to accept setting of the distance departure limit.

14. The system of claim 12, wherein the vehicle controller is configured to accept setting of the distance arrival limit.

15. The system of claim 12, wherein the departure action comprises at least one of locking vehicle doors, and activating a vehicle security feature.

16. The system of claim 12, wherein the vehicle controller is configured to provide departure time hysteresis.

17. The system of claim 12, wherein the arrival action comprises at least one of unlocking vehicle doors, activating a vehicle light, activating a vehicle horn, and deactivating a vehicle security feature.

18. The system of claim 12, wherein the vehicle controller is configured to provide arrival time hysteresis.

19. The system of claim 12, wherein the authorized mobile device comprises a smartphone.

20. The system of claim 12, wherein the authorized mobile device comprises a smartwatch.

21. A method for vehicle control comprising:
operating a vehicle controller and at least one RF vehicle device in wireless communication with the vehicle controller and cooperating therewith to;
wirelessly communicate with an authorized mobile device to generate an estimated distance between the at least one RF vehicle device and the authorized mobile device based upon an RF signal strength therebetween,
detect a departure event when the estimated distance indicates the authorized mobile device crossed a distance departure limit to permit a departure action in response thereto, and
detect an arrival event when the estimated distance indicates the authorized mobile device crossed a distance arrival limit to permit an arrival action in response thereto, wherein the distance arrival limit is longer than the distance departure limit.

22. The method of claim 21, comprising operating the vehicle to accept setting of the distance departure limit.

23. The method of claim 21, comprising operating the vehicle controller to accept setting of the distance arrival limit.

24. The method of claim 21, wherein the departure action comprises at least one of locking vehicle doors, and activating a vehicle security feature.

25. The method of claim 21, comprising operating the vehicle controller to provide departure time hysteresis.

26. The method of claim 21, wherein the arrival action comprises at least one of unlocking vehicle doors, activating a vehicle light, activating a vehicle horn, and deactivating a vehicle security feature.

27. The method of claim 21, comprising operating the vehicle controller to provide arrival time hysteresis.

28. The method of claim 21, wherein the vehicle controller comprises a first housing and a first Bluetooth® transceiver carried therein.

29. The method of claim 21, wherein the at least one RF vehicle device comprises a second housing and a second Bluetooth® transceiver carried therein.

30. The method of claim 21, wherein the authorized mobile device comprises a smartphone.

31. The method of claim 21, wherein the authorized mobile device comprises a smartwatch.

* * * * *